United States Patent
Mühlratzer

(10) Patent No.: US 7,012,035 B2
(45) Date of Patent: Mar. 14, 2006

(54) FIBRE COMPOSITE CERAMIC WITH A HIGH THERMAL CONDUCTIVITY

(75) Inventor: August Mühlratzer, München (DE)

(73) Assignee: MT Aerospace AG, Augsburg (DE)

( * ) Notice: Subject to any disclaimer, the term of this patent is extended or adjusted under 35 U.S.C. 154(b) by 0 days.

(21) Appl. No.: 10/359,280

(22) Filed: Feb. 6, 2003

(65) Prior Publication Data
US 2003/0162647 A1    Aug. 28, 2003

(30) Foreign Application Priority Data
Feb. 6, 2002    (DE)    ................................ 102 04 860

(51) Int. Cl.
*C04B 35/80*    (2006.01)
(52) U.S. Cl. ........................ 501/95.2; 501/88; 501/90; 442/178; 442/179; 428/396.4; 428/367
(58) Field of Classification Search ............... 501/95.2, 501/88, 90; 442/178, 179; 428/296.4, 367 428/396.4; 422/178, 179
See application file for complete search history.

(56) References Cited

U.S. PATENT DOCUMENTS

| 5,254,374 | A | | 10/1993 | Devlin et al. |
| 5,395,648 | A | * | 3/1995 | Davis et al. ................. 427/192 |
| 5,733,655 | A | * | 3/1998 | Bors et al. ................... 428/397 |
| 5,853,653 | A | | 12/1998 | Donato et al. |
| 6,277,440 | B1 | * | 8/2001 | Reynolds .................... 427/226 |
| 6,368,663 | B1 | * | 4/2002 | Nakamura et al. ........ 427/248.1 |
| 6,723,381 | B1 | * | 4/2004 | Murata et al. .......... 427/249.15 |
| 6,723,382 | B1 | * | 4/2004 | Yamaguchi et al. ...... 427/249.2 |

FOREIGN PATENT DOCUMENTS

| DE | 44 03 398 A1 | 10/1995 |
| DE | 199 44 345 A1 | 3/2001 |

* cited by examiner

*Primary Examiner*—Karl Group
(74) *Attorney, Agent, or Firm*—Rothwell, Figg, Ernst & Manbeck, P.C.

(57) ABSTRACT

Material from a fibre composite ceramic, constructed from
a) a dense fabric or cluster of three-dimensional oriented fibres with a high thermal conductivity,
b) a crystalline matrix of β-silicon carbide, that is produced in a CVI process on the fibres,
c) a matrix component of β-silicon carbide that in a polymer infiltration and pyrolysis process is generated in pores of the fabric structure, starting from a suspension of silicon carbide powder in a polymer, and
d) a further matrix component of β-silicon carbide that is created in a CVI process in cracks and pores of the material, caused by the preceding pyrolysis process.

12 Claims, No Drawings

FIBRE COMPOSITE CERAMIC WITH A HIGH THERMAL CONDUCTIVITY

DESCRIPTION

This invention relates to a material of a fibre composite ceramic with a high thermal conductivity combined with a high mechanical strength.

Fibre composite ceramics and/or materials manufactured from them have a substantially improved crack resistance compared with monolithic technical ceramics. Materials and components from fibre composite ceramics therefore have an increased extensibility and thus damage tolerance. If, however, such components are exposed to increased temperatures, such as in heat engines, heat exchangers, hot gas ducts and hot gas nozzles, their load capacity is restricted because thermal stresses occur at or in the components. A main reason for this is the generally poor thermal conductivity of the typically porous and heterogeneously constructed material structure of fibre composite ceramics.

The poor thermal conductivity of fibre composite ceramics is an obstacle particularly for the manufacture of components for plasma enclosure vessels of thermonuclear fusion plants, even though other properties of the material would make them very suitable for this. These material properties are the high temperature strength and thermal shock resistance, a good resistance to the effect of plasma and the construction from light elements with rapidly-decaying radioactive radiation following activation in the operation of the fusion reactor.

There has therefore been no shortage of attempts to improve the thermal conductivity of fibre composite ceramics.

An attempt has, for example, been made to increase the thermal conductivity in the direction of the thickness of the structure, which is essential to avoid stresses, by increasing the fibre content up to 47% of the total fibre content in this direction (C. A. Nanetti et al. Manufacturing of advanced three-dimensional texture $SiC_f$/SiC composites, $4^{th}$ IEA Workshop on SiC/SiC Ceramic Matrix Composites for Fusion Structural Applications, 12 to 13 October 2000, Frascati, Italy, pages 92 to 100). Very thick fibre strands with a high number of individual filaments were used. The material also included a matrix of silicon carbide that was partially produced by chemical vapour phase infiltration and partly from a solid which was created by the pyrolysis of a polymer containing silicon. The measurement of the temperature conductivity of this material showed a value of 0.03 $cm^2$/s at room temperature. A two-dimensional reinforced SiC/SiC fibre composite ceramic (H. Tawil et al., Thermal diffusivity of chemically vapour deposited silicon carbide reinforced with silicon carbide fibers, J. Mater. Sci. 20 (1985) pages 3201–3212) shows a temperature conductivity of 0.11 $cm^2$/s. The reason for this may be that the achieved density as well as the degree of crystallization of the matrix derived from polymers are too low. Both variables distinctly influence the conductivity (H. Tawil et al., ibid.).

Also the thermal conductivity, calculated as a product of temperature conductivity, specific heat capacity and density, of the above two-dimensional reinforced SiC/SiC composite ceramic produced using vapour phase infiltration is not sufficient to minimise the thermal fatigue sufficiently for operation in plants of which long service lives are demanded.

One of the solutions which would largely meet the requirements regarding thermal conductivity was achieved by filling the pores with reaction bonded silicon carbide (SiC) (R. Yamada et al., JAERI's Recent Activities on SiC/SiC Composites for Fusion, $4^{th}$ IEA Workshop on Si/SiC Ceramic Matrix Composites for Fusion Structural Applications, 12 to 13 October 2000, Frascati, Italy, pages 33 to 41). It is, however, known that in the formation of reaction bonded SiC from the elements, molten silicon also reacts with the fibre surfaces at the reaction temperature. This causes the mechanical properties, particularly strength and strain at break, of the ceramic composite material to be seriously impaired, i.e. the effect of the fibre reinforcement is largely lost. Furthermore a residual amount of free silicon in which the reaction has not been brought to completion remains in the material, which in some applications is undesirable, particularly with regard to chemical corrosion.

The object of this invention is therefore to produce a material of fibre composite ceramic that has a high thermal conductivity combined with a high mechanical strength and is therefore suitable for the manufacture of components exposed to both high mechanical and thermal stress.

The object of the this invention is therefore a material made of a fibre composite ceramic, that is constructed of
a) a dense fabric or cluster of fibres with a three-dimensional orientation and high thermal conductivity,
b) a crystalline matrix of β-silicon carbide that is created in a CVI process essentially from the fibres,
c) a matrix component of β-silicon carbide that is created in pores of the fabric or cluster structure, in a polymer infiltration and pyrolysis process starting from a suspension of silicon carbide powder in a polymer and
d) a further matrix component of β-silicon carbide that is created in a CVI process in cracks and pores due to the preceding pyrolysis process.

A material of this kind has a surprisingly high thermal conductivity both at room temperature and at increased temperatures (1000° C.) and a high mechanical strength.

The object of the invention is also a method for the manufacture of the stressed material.

The object of the invention is also the use of a stressed material to create components for heat engines, heat exchangers, hot gas ducts and hot gas nozzles and components of plasma enclosure vessels for thermonuclear fusion plants.

The coating of β-silicon carbide is preferably created simultaneously with the last process step.

Fibre strands of 800 to 3000 filaments are used for the fibre fabric or cluster, to make sure that during the matrix infiltration the individual fibre interstices are penetrated by the SiC matrix. Fibre strands with a greater number of filaments can no longer be uniformly infiltrated with matrix and lead to a gradient of the separated SiC amount reducing towards the centre of the strand, that in the core area of the fibre strands would be no longer sufficient to bridge the fibre interstices.

Polycrystalline, randomly composed silicon carbide fibres, such as for example are known under the trade names Sylramice® or Tyranno SA®, which have a thermal conductivity of 64 W/mK at room temperature, are used as reinforcing fibres. Carbon fibres with a correspondingly good, or even higher, thermal conductivity, perhaps with graphite fibres known as Granoc® with a thermal conductivity of 500 W/mK, can also be used.

However, a C/SiC composite ceramic can be disadvantageous compared with a SiC/SiC composite ceramic in that, because of the different thermal coefficients of expansion of the carbon fibres and the SiC matrix ($\alpha_{Matrix} > \alpha_{Fibre}$), they have matrix cracks which occur during the cooling from the manufacturing temperature. These cracks hinder the heat flow through the matrix, the conductivity of which would actually be higher than that of the fibres. For use as a wall material in plasma fusion systems, carbon fibres are less satisfactory compared with silicon carbide fibres and also with regard to their swelling behaviour under the action of neutrons.

The three-dimensional fabric or cluster formed from the fibres has at least 35% by volume of fibres, with at least 10% of the fibre being oriented in the direction of the thickness of the fabric or cluster. Because the fibres are oriented in the direction of the thickness, not only is the thermal conductivity of the finished composite improved but also additionally increased by the silicon carbide matrix deposited up on it in the vapour phase infiltration process. In other words, due to the vapour phase infiltration process (CVI process) a coating of the fibre surfaces, and thus a continuation of the produced structure is achieved.

In accordance with the invention, the fibres are also coated with a thin (approximately 100 nm) layer of carbon, so that when mechanical stresses occur which could lead to the formation of matrix cracks, the necessary separation of matrix and fibres is guaranteed. That is the basic mechanism for the pseudoplastic behaviour and the associated tolerance of expansion and damage of fibre composite ceramics. Finely dispersed carbon/silicon carbide mixed coatings or multilayer coatings formed alternately by carbon and silicon carbide, such as are known from literature, can be used for establishing this function.

The vapour phase infiltration process used on the fibre cluster or fabric leads to a permeable skeleton with a crystalline dense structure of β-silicon carbide, which because of its density has good thermal conductivity. Together with the fibres, this silicon carbide skeleton is the main carrier of the thermal conduction through a wall of the material in accordance with the invention.

To construct this skeleton, the graduated CVI process in accordance with the invention, preferably a method such as is described in the German patent application 101 01 546.1, is used. In this case, for the CVI deposition, a silicon carbide precursor in a suitable carrier gas is allowed to act on the fibre cluster and/or fabric under a process pressure of $\geq 0.6$ bar absolute and a process temperature of $\geq 1100°$ C. Preferred process parameters are a $H_2/CH_3Cl_3Si$ ratio of 4:1, a process temperature of 1100 to 1200° C. and a process pressure of between 600 to 800 mbar.

The matrix component, that is constructed by the polymer infiltration and pyrolysis process and based on a suspension of silicon carbide powder in a polymer, is used to fill large-volume pores in the fabrics and/or clusters used and as a substrate for the silicon carbide deposited in the second, succeeding vapour phase infiltration process.

β-silicon carbide with a grain size of $\leq 1$ μm, preferably 0.3 μm is used as the silicon carbide powder. A silicon organic polymer is homogenously mixed with a small amount of toluene (to reduce the viscosity) in a dispersing device. The silicon organic polymer is a precursor of silicon carbide formed from it by thermal decomposition with the exclusion of air and it acts as a binder. The polymer is chosen so that it produces a crystalline β-silicon carbide at the lowest possible pyrolysis temperature. Methyl-, vinyl- and/or methylvinylpolycarbosilane with which crystalline silicon carbide forms above a temperature of 1300° C. have proved advantageous. Using polytitanocarbosilane, crystalline silicon carbide can be formed even from approximately 1200° C., but the amount of titanium oxide must be taken into account. The best results for the production of pure β-silicon carbide have been obtained by using allyl hydridopolycarbosilane, although in this case a temperature of at least 1600° C. is required. Because longer action times are necessary with thick-walled components, damage to the silicon carbide fibres can occur.

To reduce the temperature required to produce crystalline silicon carbide, it is advantageous to additionally use silicon carbide extra fine powder, so-called nano powder, with a grain size of 30 nm. This particularly sinter-active powder supports the formation of sinter bridges between the grains of the coarser powder. It also supports the crystallisation of the solids, produced from the silicon-organic polymer by pyrolysis, to form the required β-silicon carbide. Care must be taken to make sure that only small amounts of such nano powder is used, because the pressureless sintering in large volume units used here leads to a mircroporous product, which then impairs the thermal conductivity.

The pores of the composite material infiltrated with silicon carbide in the CVI process are impregnated in a vacuum with the slick from the silicon carbide powder and 45% by mass of the silicon-organic polymer. After drying, a heat treatment is carried out in an argon atmosphere. The heating is carried out in phases with pauses at 300 and 600° C. up to the crystallisation temperature, i.e. for example 1400° C. when methylpolycarbosilane is used as the silicon carbide precursor. Cooling takes place after a dwell time of 30 minutes. A maximum of two impregnation and pyrolysis cycles are carried out, but preferably only one.

The free volumes produced by the shrinkage of the silicon-organic resin during the pyrolysis process and the sinter shrinkage of the silicon carbide are filled with β-silicon carbide using the novel vapour phase infiltration in the aforementioned process. Because the firing shrinkage in the preceding process step has left a cohesive network of cracks and pore channels, the deposition of the silicon carbide from the vapour phase on the sides of the cracks and channel walls produces a corresponding continuous system of silicon carbide veins, thus creating a so-called penetration bond. In view of the desired high thermal conductivity, it is advantageous in this case that the crystalline silicon carbide produced previously in the polymer infiltration and pyrolysis process, favourably influences the nucleation and crystal growth of the β-silicon carbide deposited in the vapour phase, and thus an internal bond and a pure silicon carbide with grain limits that are free from foreign phases, such as carbon, is obtained.

Because of the already reduced porosity and the associated infiltratability in the final phase of the process, the last CVI process step produces a coating of silicon carbide that favourably influences the total thermal conductivity of the component and also has a sealing effect.

The invention is explained in the following by use of an example, which is in no way meant to limit the scope of the invention.

EXAMPLE OF EMBODIMENT

A plate-shaped component curved in two spatial directions was produced as follows from SiC/SiC fibre composite ceramic:

A three-dimensional fabric from the high-temperature resistant silicon carbide fibres Tyranno SA® with a 45% fibre content in both the x and y directions and 10% fibre in the z direction (=thickness) measuring 350 mm×250 mm×3 mm was covered, in a heated state, with a phenolic resin in a powder state, which stuck to it. The fabric piece pre-treated in this way was pressed to shape in a hot press using an aluminium matrix shaped to the required component geometry. After the resin had solidified, the fabric was fixed in the component shape. This component pre-shape was thermally stabilised in argon at 1100° C. and held for 30 minutes. In this state, the pre-form was placed in a CVI system and the fibres were first coated in a methane atmosphere at 30 mbar and 1100° C. with approximately 100 nm pyrocarbon. In the next process step, a silicon carbide matrix was deposited on the carbon coating by means of a $H_2/CH_3Cl_3Si$ mixture at a ratio of 4:1 at a volumetric flow of 25 l/min and a temperature of 1100° C. The duration of this first vapour phase infiltration with silicon carbide took 22 hours for a wall thickness of 3 mm.

The component edges were trimmed undersize to a thickness which took account of the silicon carbide coating to be subsequently applied. The component was then impregnated in a vacuum apparatus by a mixture of methylvinylpolycarbosilane (55% by weight) and β-silicon carbide powder. 50% of the silicon carbide powder has a grain size of 0.3 μm, the remainder a grain size of less than 1 μm. The component was then subjected to a temperature treatment under argon in steps of 300, 600, 1100 and 1600° C. with a retention time of 30 minutes at each step. This created a pore filling with complete crystalline β-silicon carbide with a bimodal grain size distribution, with the silicon carbide derived from the silicon-organic resin having a grain size of less than 0.1 μm.

The substantial shrinkage in mass and volume that occurs during the high temperature treatment has led to the formation of pores and cracks in the matrix formed in the cavities, which run through the complete, newly-formed silicon carbide structure. In a further CVI process step under the same conditions as above, silicon carbide is infiltrated into these cracks and pores in the vapour phase. The process was, however, expanded to 30 hours and the component surface was coated with a silicon carbide coating which was approximately 100 μm thick.

With the procedure described and the named substances used, a product was produced from fibre composite ceramic that is characterised by the following structure: Crystalline silicon carbide fibres coated by a thin coating of pyrocarbon and oriented in strands of 800 to 3000 single fibres in all three spatial directions, are tightly enclosed by columnar and heavily twinned, grown β-silicon carbide that is a few μm thick in the inside of the fibre bundles but effects a materially-complete bond of the individual fibres and is up to approximately 10 μm thick in the outer areas of the fibre bundles. The pore volumes between the crossing filaments, due to the makeup of the structure, are filled with crystalline β-silicon carbide with a grain size of □1 μm. The structure of this pore filling is penetrated by a network of shrinkage cracks and pores. These are in turn penetrated by tightly grown, heavily twinned silicon carbide deposited in the vapour phase. In the outer area of the component, this crack and pore filling changes seamlessly into an external covering layer. When the component has had surface machining for matching reasons and a separate coating has to be applied, the silicon carbide is completely densely grown even though a boundary line due to the new nucleation is detectable.

Measurements on a workpiece in accordance with the invention have, at room temperature, shown a temperature conductivity of 0.2 and of 0.08 $cm^2/s$ at 1000° C. in the direction of the thickness. This results, at the determined density of 2.78 $g/cm^3$ and a specific heat capacity of 650 J/kgK at room temperature and 1000 J/kgK at 1000° C., in a thermal conductivity of 36 W/mK at room temperature and of 22 W/mK at 1000° C.

The mechanical characteristic values of the material in accordance with the invention were a tensile strength in the x and y directions of 310 MPa, a bending strength of 630 MPa, a compressive strength of 680 MPa, and an interlaminar shear strength of 65 MPa.

Thus, the material properties required for the high temperature application stated in the introduction, i.e. a high thermal conductivity combined with a high mechanical strength, were achieved.

What is claimed is:

1. Material consisting of a fibre composite ceramic, comprising
   a) a fabric or cluster of polycrystalline, stoichiometrically assembled silicon carbide fibres that at room temperature have a thermal conductivity of about 64 W/mK, or carbon fibers with a thermal conductivity of ≧64 W/mK, wherein the fibres extend in the x-, y-, and z-directions, with at least 10% of the total amount of fibre being oriented in the z-direction of the material,
   b) a crystalline matrix of β-silicon carbide, which is created essentially on the fibres by a CVI process,
   c) a matrix component of β-silicon carbide, which in a polymer infiltration and pyrolysis process, starting from a suspension of silicon carbide powder in a polymer, is created in pores of the fabric and/or cluster structure, and
   d) a further matrix component of β-silicon carbide, which is created in cracks and pores of the material, produced in the preceding pyrolysis process, by a CVI process.

2. Material in accordance with claim 1, wherein the material is coated with a coating of β-silicon carbide.

3. Material in accordance with claim 1, wherein the fabric and/or cluster of fibre strands is formed from 800 to 3000 filaments in each fibre strand.

4. Material in accordance with claim 1, wherein the fabric and/or cluster is formed from silicon carbide fibres and/or carbon fibres.

5. Material in accordance with claim 1, wherein the fabric and/or cluster has at least 35% by volume of fibres.

6. Material in accordance with claim 1, wherein a thin coating of carbon, finely dispersed carbon/silicon mixture or alternate layers of carbon and/or silicon carbide is, or are, arranged between the fibres and the surrounding crystalline matrix or β-silicon carbide.

7. Material in accordance with claim 6, wherein the silicon carbide powder is β-silicon carbide with a grain size of 1 micron or less.

8. Material in accordance with claim 6, wherein the polymer is a silicon-organic polymer selected from the group consisting of methylpolycarbonsilane, vinylpolycarbonsilane, and/or methylvinylpolycarbonsilane, polytitancarbonsilane, and/or allyl hydridopolycarbosilane.

9. Material in accordance with claim 6, wherein the polymer, in addition to the SiC powder, includes SiC extra fine powder with a grain size of 30 nm.

10. Material in accordance with claim 7, characterized in that the silicon carbide powder is β-silicon carbide with a grain size of about 0.3 $\mu$m.

11. A fibre composite ceramic material with high thermal conductivity, comprising;
  a) a fabric or cluster of polycrystalline, stoichiometrically assembled silicon carbide fibres that at room temperature have a thermal conductivity of about 64 W/mK, or carbon fibers with a thermal conductivity of 64 W/mK, which fibres are three dimensionally oriented, wherein the fabric or cluster comprises at least 35 vol. % of fibres of which at least 10% are oriented in the direction of the thickness of a workpiece to be produced,
  b) a crystalline matrix of β-silicon carbide produced by a CVI process on said fibres,
  c) a matrix of silicon carbide produced in pores of the fabric or cluster structure wherein the silicon carbide is produced in a polymer infiltration and pyrolysis process from a starting suspension of silicon carbide powder having a grain size in the range from about 0.3 to 1 $\mu$m, and
  d) a further matrix component of β-silicon carbide, wherein the β-silicon carbide is produced by a CVI process within cracks and pores of the composite ceramic material.

12. The fibre composite ceramic material in accordance with claim 1, wherein the thermal conductivity of said material is about 22 W/mK at 1000° C.

* * * * *